Jan. 8, 1929.  
J. A. SWEET  
1,698,378  
APPARATUS FOR DRAWING GLASS  
Filed Dec. 14, 1927   3 Sheets-Sheet 1
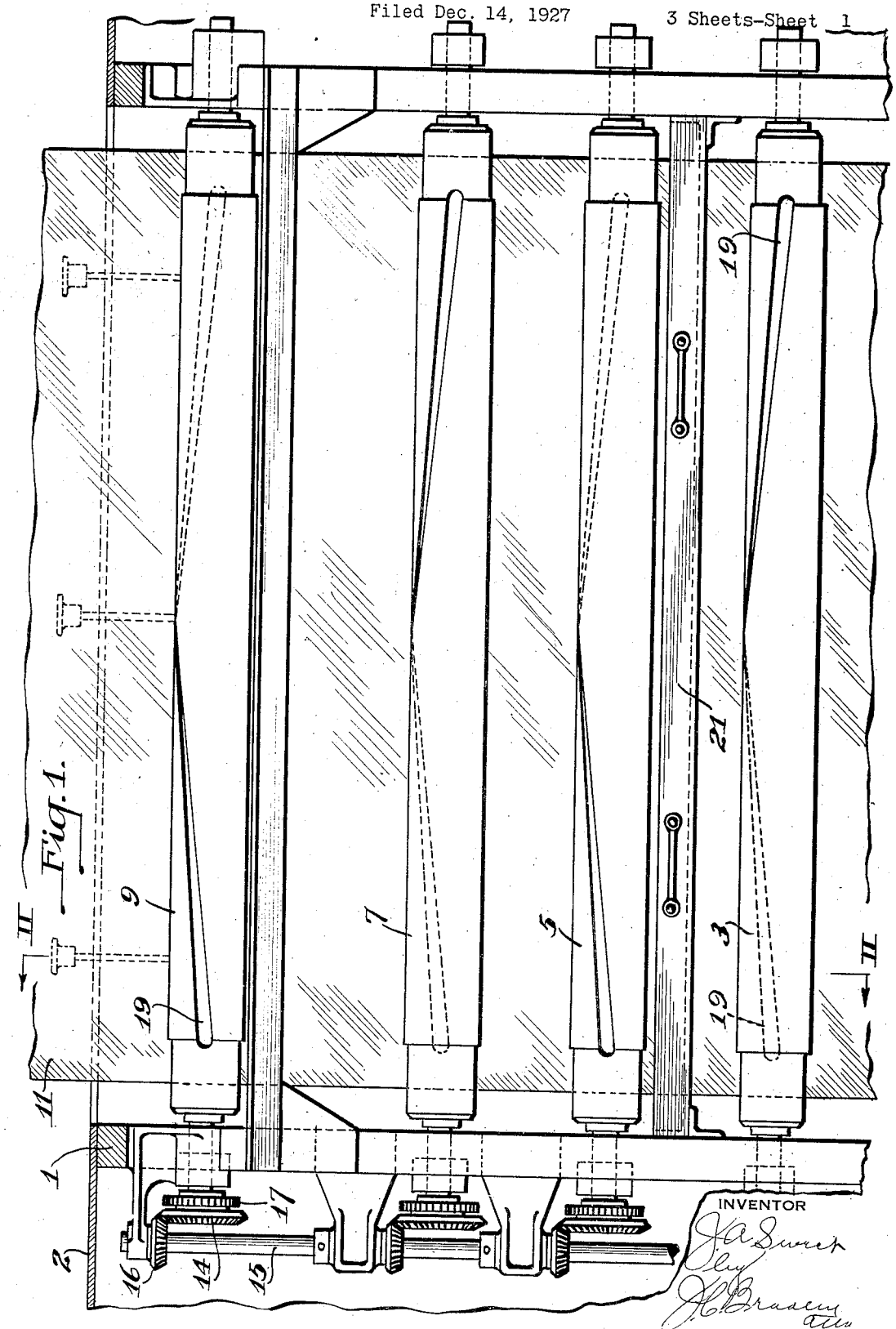

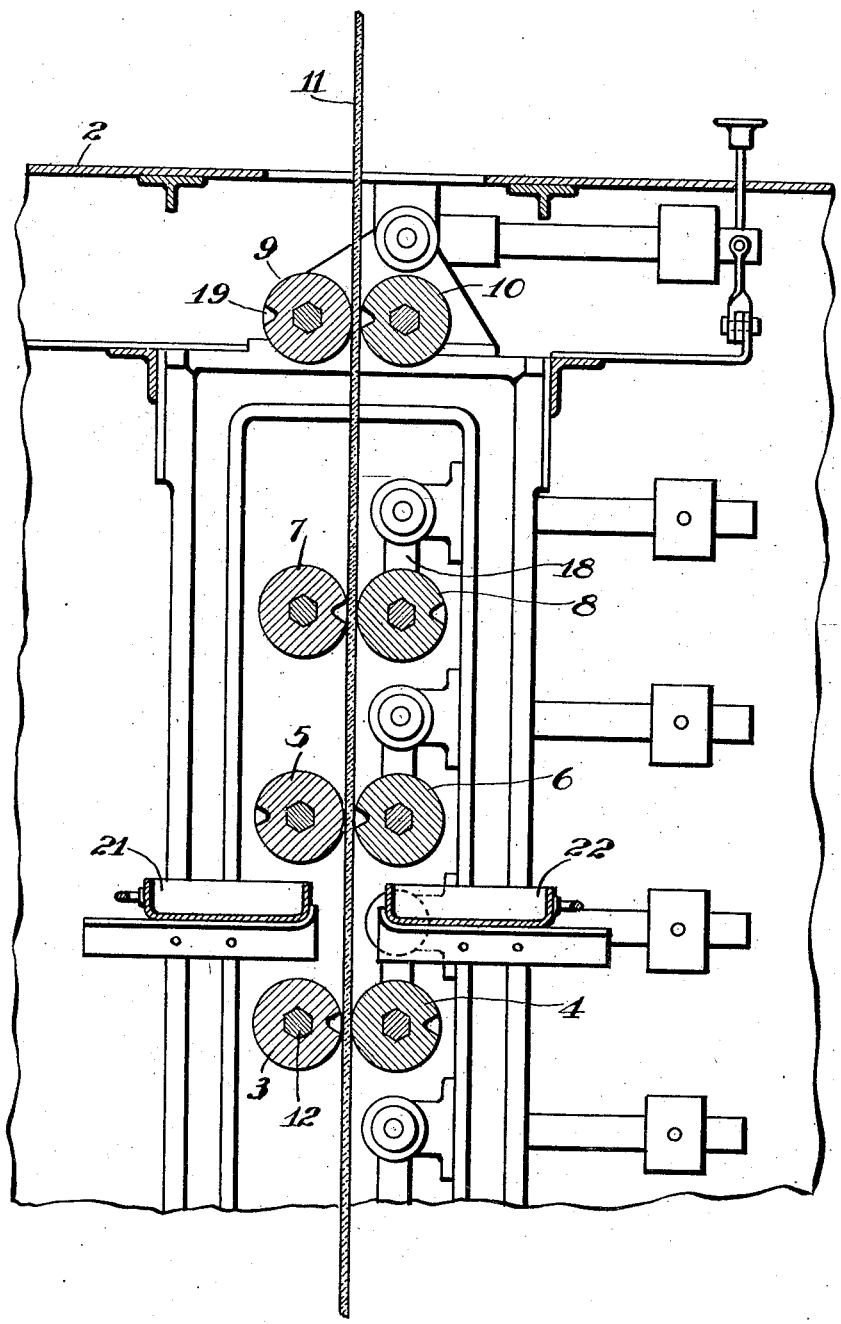

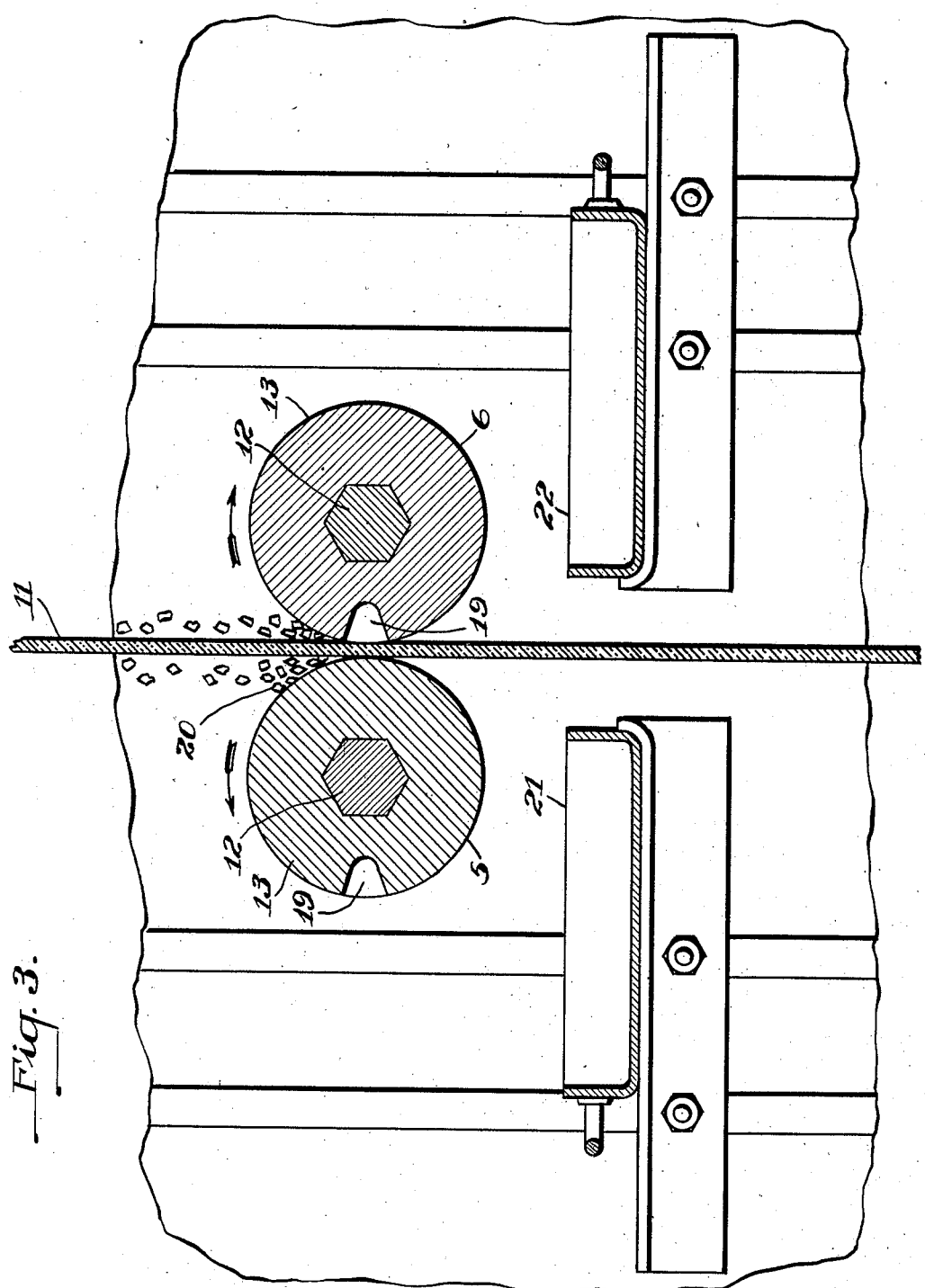

Patented Jan. 8, 1929.

1,698,378

UNITED STATES PATENT OFFICE.

JOHN A. SWEET, OF PITTSBURGH, PENNSYLVANIA, ASSIGNOR TO PITTSBURGH PLATE GLASS COMPANY, A CORPORATION OF PENNSYLVANIA.

APPARATUS FOR DRAWING GLASS.

Application filed December 14, 1927. Serial No. 239,900.

The invention relates to apparatus for drawing glass upwardly in a continuous sheet or ribbon; such as is done by the well-known Fourcault system. This apparatus employs a series of pairs of driven rollers, having surfaces of somewhat yielding material, such as molded asbestos, which grip the sheet and draw it upward continuously, through a leer casing, the glass being cut off in lengths as it emerges from the top of the apparatus. In the use of such an apparatus, there is a certain amount of breakage from time to time in the upper part of the leer casing, the sheet sometimes cracking longitudinally and sometimes transversely. The larger pieces of glass which crack off are fed upward by the rollers and are readily removed at the top, but the chips or small particles, which are broken away, are difficult of removal and work their way down along the sheet between such sheet and the rolls, where they accumulate and scratch the oncoming sheet. Some of these particles also get past the rolls and are picked up by the hot glass at the base of the sheet, adhering thereto and marring its surface. Chips are also formed when the glass is severed above the casing, and such chips also fall down between the rolls, and cause the same trouble, as above pointed out with respect to the chips formed by breakage. The present invention involves an expedient for getting rid of the chips which fall down between the rolls, this being accomplished by providing grooves longitudinally in the surfaces of the rolls, into which the chips fall, and are carried by the rotation of the rolls to the rear sides thereof, where they are dumped by gravity into suitable receptacles placed below the level of the rolls. These grooves preferably extend circumferentially of the rolls, as well as longitudinally thereof, in order not to impair the continuity of the roll surface and thus interfere with its gripping effect upon the glass sheet. One embodiment of the invention is illustrated in the accompanying drawings, wherein:

Fig. 1 is a vertical section showing the upper portion of the drawing apparatus. Fig. 2 is a section on the line II—II of Fig. 1. And Fig. 3 is an enlarged section through a part of the apparatus also taken on the line II—II of Fig. 1.

Referring to the drawings, 1 is the supporting framework of the upper portion of the leer casing, such framework terminating at the working floor 2, and 3, 4, 5, 6, 7, 8, 9 and 10 are pairs of rolls mounted in suitable bearings in the framework and engaging the opposite surfaces of the continuous glass sheet or ribbon 11 which is being drawn. The rolls comprise the central axles 12, 12 covered with the asbestos 13, 13, which is molded on the axles 12, 12 and relatively compact, the quality of asbestos required for this service being well-known in the art. The rolls on one side of the sheet are provided with the beveled gears 14 driven from the shaft 15 by means of the gears 16 (Fig. 1), while the rolls on the other side of the sheet are driven by means of spur gears meshing with the gears 17 carried by the shafts which carry the gears 14. This last set of rolls are mounted upon the counter-weighted bell crank levers 18 (Fig. 2), so that the required degree of pressure between the two sets of rolls is secured, this also being an arrangement well-known in the art, as is the method for driving the rolls.

Each of the rolls is provided with a groove 19 which extends longitudinally of the roll and also circumferentially thereof and is adapted to receive the particles of broken glass which work down along the sheet. This is illustrated in Fig. 3, in which the reference numeral 20 indicates the particles of broken glass. These particles accumulate on each side of the sheet between the surface of the sheet and the surface of the roll and remain in this position until the groove 19 arrives in a position next to the sheet at which time the particles drop into the groove and are carried around the roll and are dumped into the receptacles 21 and 22, the left hand end roll 5 shown in Fig. 3 being illustrated in discharging position, while the right hand roll 6 is illustrated in the position occupied just before it reaches a point where it receives the broken glass on the right hand side of the sheet. As indicated in Fig. 2, the one set of receptacles 21 and 22 serves to collect the glass from the three sets of rolls lying thereabove. The number of these receptacles may be multiplied to suit requirements, the receptacles being mounted for ready removal, so that their contents may be dumped from time to time. The spiral grooves 19 are shown as extending only half way around the rolls, but if desired, this groove might be made to completely encircle the roll, the function accomplished being the same in each case. As heretofore indicated, it is desirable to have the groove extend circumferentially instead of in a right line longitudinally of the roll, since the tractive effect of the roll upon the glass is not impaired to any extent when the groove extends circumferentially as would be the case if the groove were a straight one.

What I claim is:

1. In combination in a glass drawing apparatus, a plurality of sets of traction rolls arranged in series for gripping the glass therebetween, one of such rolls being provided with a groove extending longitudinally thereof.

2. In combination in a glass drawing apparatus, a plurality of sets of traction rolls arranged in series for gripping the glass therebetween, one of such rolls being provided with a groove extending longitudinally thereof, and also circumferentially.

3. In combination in a glass drawing apparatus, a plurality of sets of traction rolls arranged in series for gripping the glass therebetween, one of such rolls on each side of the sheet being provided with a spiral groove.

4. In combination in a glass drawing apparatus a plurality of sets of traction rolls arranged in series for gripping the glass therebetween, one of such rolls having a longitudinal groove, and a receptacle located beneath the roll in position to receive any glass particles or chips collected by the roll and carried thereby around the roll to gravity discharge position above the receptacle.

5. In combination in a glass drawing apparatus, a plurality of sets of traction rolls arranged in series for gripping the glass therebetween, a plurality of such rolls on each side of the sheet being provided with grooves extending longitudinally thereof and also circumferentially.

In testimony whereof, I have hereunto subscribed my name this 7th day of Nov., 1927.

JOHN A. SWEET.